(12) United States Patent
Stammer et al.

(10) Patent No.: US 8,865,800 B2
(45) Date of Patent: *Oct. 21, 2014

(54) HYDROSILYLATION CURABLE COMPOSITIONS

(75) Inventors: Andreas Stammer, Pont-a-Celles (BE); Andreas Wolf, Huenstetten (DE)

(73) Assignee: Dow Corning Corporation, Midland, MI (US)

( * ) Notice: Subject to any disclaimer, the term of this patent is extended or adjusted under 35 U.S.C. 154(b) by 392 days.

This patent is subject to a terminal disclaimer.

(21) Appl. No.: 12/595,889

(22) PCT Filed: Apr. 9, 2008

(86) PCT No.: PCT/EP2008/054268
§ 371 (c)(1),
(2), (4) Date: Mar. 18, 2010

(87) PCT Pub. No.: WO2008/125561
PCT Pub. Date: Oct. 23, 2008

(65) Prior Publication Data
US 2010/0206477 A1 Aug. 19, 2010

(30) Foreign Application Priority Data
Apr. 16, 2007 (GB) .................................... 0707176

(51) Int. Cl.
C08J 9/32 (2006.01)
C09B 67/00 (2006.01)
C08L 101/10 (2006.01)
C08L 101/00 (2006.01)

(52) U.S. Cl.
CPC ................. C08L 101/10 (2013.01); C08L 101/00 (2013.01)
USPC ........... 523/218; 524/502; 524/519; 524/525; 524/526; 524/528; 525/100; 525/105; 525/446; 525/479; 428/447

(58) Field of Classification Search
CPC ......... C08L 23/00; C08L 25/04; C08L 43/04; C08L 83/06; C08L 53/02; C08K 3/0016; C08K 3/10
USPC .......... 523/218; 524/502, 528, 525, 526, 519; 525/106, 100, 446, 479, 105; 428/447
See application file for complete search history.

(56) References Cited

U.S. PATENT DOCUMENTS

| | | |
|---|---|---|
| 3,419,593 A | 12/1968 | Willing |
| 3,445,420 A | 5/1969 | Kookootsedes et al. |
| 3,715,334 A | 2/1973 | Karstedt |
| 3,814,730 A | 6/1974 | Karstedt |
| 3,923,705 A | 12/1975 | Smith |
| 3,989,667 A | 11/1976 | Lee et al. |
| 3,989,668 A | 11/1976 | Lee et al. |
| 4,183,844 A | 1/1980 | Streck et al. |
| 4,381,377 A | 4/1983 | Kampf et al. |
| 4,753,978 A | 6/1988 | Jensen |
| 4,758,631 A | 7/1988 | Kennedy et al. |
| 4,808,664 A | 2/1989 | Saam |
| 4,900,772 A | 2/1990 | Imanaka et al. |
| 4,904,732 A | 2/1990 | Iwahara et al. |
| 5,036,117 A | 7/1991 | Chung et al. |
| 5,120,379 A | 6/1992 | Noda et al. |
| 5,175,325 A | 12/1992 | Brown et al. |
| 5,247,021 A | 9/1993 | Fujisawa et al. |
| 5,262,502 A | 11/1993 | Fujisawa et al. |
| 5,290,873 A | 3/1994 | Noda et al. |
| 5,409,995 A | 4/1995 | Iwahara et al. |
| 5,580,925 A | 12/1996 | Iwahara et al. |
| 5,719,230 A | 2/1998 | Ando et al. |

(Continued)

FOREIGN PATENT DOCUMENTS

DE 19821356 A1 11/1999
EP 320259 A2 * 6/1989 ............... C08F 8/12

(Continued)

OTHER PUBLICATIONS

"ASTM E2189" 10 Standard Test Method for Testing Resistance to Fogging in Insulating Glass Unit, 1996. http://www.astm.org/standards/E2189.htm. Retrieved online [Oct. 1, 2011].*
"EN1279-6" Glass in building. Insulating glass units, 2011. http://shop.bsigroup.com/productdetail. Retrieved online [Oct. 1, 2011 ].*
English language abstract fro JP 02075644 extracted from espacenet.com database, dated Jan. 8, 2010, 6 pages.
English language translation and abstract for JP 06-279691 extracted from PAJ database, dated Jan. 11, 2010, 74 pages.
English language abstract for WO 96-21633 extracted from espacenet.com database, dated Jan. 8, 2010, 39 pages.

(Continued)

*Primary Examiner* — Hannah Pak
(74) *Attorney, Agent, or Firm* — Howard & Howard Attorneys PLLC; Claude F. Purchase

(57) ABSTRACT

A hydrosilylation curable composition containing a comprising (A) 100 parts by weight of an organic polymer having on average at least 1.4 alkenyl groups per molecule; (B) an amount sufficient to cure the composition of a crosslinker having on average at least 1.4 Si—H groups per molecule; (C) a platinum group metal-containing catalyst in an amount sufficient to effect curing of the composition; (D) 0.1 to 20 parts by weight per 100 parts by weight of (A) of an alkoxy silyl substituted organic oligomer having a number average molecular weight in the range of 200 to 5,000, having a polymer backbone selected from the group of polybutadiene, polyisoprene, polyisobutylene, copolymers of isobutylene and isoprene, copolymers of isoprene and butadiene, copolymers of isoprene and styrene, copolymers of butadiene and styrene, copolymers of isoprene, butadiene and styrene and polyolefin polymers prepared by hydrogenating polyisoprene, polybutadiene or a copolymer of isoprene and styrene, a copolymer of butadiene and styrene or a copolymer of isoprene, butadiene and styrene, and optionally a titanium compound having Ti—O—C bonds. The composition provides improved self adhesion to substrates.

30 Claims, No Drawings

(56) References Cited

U.S. PATENT DOCUMENTS

| | | | |
|---|---|---|---|
| 5,728,768 A | 3/1998 | Saxena et al. | |
| 5,804,253 A | 9/1998 | Hagiwara et al. | |
| 5,880,195 A | 3/1999 | Kalinowski et al. | |
| 5,928,794 A * | 7/1999 | Kalinowski et al. | 428/447 |
| 6,020,446 A | 2/2000 | Okamoto et al. | |
| 6,150,441 A | 11/2000 | Chiba et al. | |
| 6,177,519 B1 | 1/2001 | Chung et al. | |
| 6,194,498 B1 | 2/2001 | Anderson et al. | |
| 6,281,321 B1 * | 8/2001 | Kelly et al. | 528/17 |
| 6,380,316 B1 | 4/2002 | Bahadur et al. | |
| 2003/0162882 A1 | 8/2003 | Grimm et al. | |
| 2006/0079645 A1 * | 4/2006 | Hasegawa et al. | 525/191 |
| 2008/0020154 A1 * | 1/2008 | Landon et al. | 428/34 |
| 2010/0206477 A1 | 8/2010 | Stammer et al. | |
| 2010/0298467 A1 * | 11/2010 | Stammer et al. | 523/218 |

FOREIGN PATENT DOCUMENTS

| | | |
|---|---|---|
| EP | 0545116 A2 | 6/1993 |
| EP | 0850996 A2 | 7/1998 |
| EP | 0850997 A2 | 7/1998 |
| EP | 1000980 A1 | 5/2000 |
| EP | 1099728 A1 | 5/2001 |
| EP | 1254192 B1 | 8/2004 |
| EP | 1466939 A1 | 10/2004 |
| EP | 1598402 A1 | 11/2005 |
| EP | 1637544 A2 | 3/2006 |
| EP | 1650257 A1 | 4/2006 |
| JP | 01-158065 A | 6/1989 |
| JP | 2075644 A | 3/1990 |
| JP | 06279691 A | 10/1994 |
| JP | 08-019270 B | 2/1996 |
| JP | 08-041358 A | 2/1996 |
| JP | 10-316804 A | 12/1998 |
| JP | 10-316811 A | 12/1998 |
| JP | 11-209540 A | 8/1999 |
| JP | 2001-240756 A | 9/2001 |
| JP | 2001-303024 A | 10/2001 |
| JP | 2005-187705 A | 7/2005 |
| JP | 2006-249250 A | 9/2006 |
| WO | WO 9621633 A1 | 7/1996 |
| WO | WO 97/31032 A1 | 8/1997 |
| WO | WO 0149774 A2 | 7/2001 |
| WO | WO 01/72922 A1 | 10/2001 |

OTHER PUBLICATIONS

PCT International Search Report for PCT/EP2008/054268, dated Sep. 3, 2009, 4 pages.
English language abstract for DE 19821356 extracted from the espacenet.com database on Jan. 12, 2010, 7 pages.
English language abstract for JP 01-158065 extracted from the espacenet.com database on Jan. 12, 2010, 12 pages.
English language abstract and translation for JP 08-019270 extracted from the espacenet.com and PAJ databases on Jan. 12, 2010, 44 pages.
English language abstract and translation for JP 08-041358 extracted from the PAJ database on Jan. 15, 2010, 40 pages.
English language abstract and translation for JP 10-316804 extracted from the PAJ database on Jan. 15, 2010, 46 pages.
English language abstract and translation for JP 10-316811 extracted from the PAJ database on Jan. 15, 2010, 58 pages.
English language abstract and translation for JP 11-209540 extracted from the PAJ database on Jan. 15, 2010, 50 pages.
English language abstract and translation for JP 2001-240756 extracted from the PAJ database on Jan. 15, 2010, 34 pages.
English language abstract and translation for JP 2001-303024 extracted from the PAJ database on Jan. 12, 2010, 29 pages.
English language abstract and translation for JP 2005-187705 extracted from the PAJ database on Jan. 15, 2010, 41 pages.
English language abstract and translation for JP 2006-249250 extracted from the PAJ database on Jan. 15, 2010, 56 pages.
English language abstract for WO 97/31032 extracted from the espacenet.com database on Jan. 12, 2010, 38 pages.
English language abstract for WO 01/72922 extracted from the espacenet.com database on Jan. 12, 2010, 28 pages.
International Search Report for Application No. PCT/EP2008/054267 dated Sep. 1, 2008, 2 pages.

* cited by examiner

HYDROSILYLATION CURABLE COMPOSITIONS

RELATED APPLICATIONS

This application claims priority to and all the advantages of International Patent Application No. PCT/EP2008/054268, filed on Apr. 9, 2008, which claims priority to Great Britain Patent Application No. GB0707176.4, filed on Apr. 16, 2007.

This invention relates to an hydrosilylation curable composition containing alkenyl functional organic polymers and Si—H functional crosslinkers having improved self adhesion to substrates.

Hydrosilylation curable compositions which utilize a Si—H functional or Si—H containing compound to crosslink an alkenyl functional organic polymer are useful when cured as sealants, adhesives, coatings, moulding and potting compounds, gels and additives.

Hydrocarbon polymers that are curable by hydrosilylation (hydrosilation) cure are useful when cured as sealants, adhesives, coatings, moulding and potting compounds, gels and additives. Hydrosilylation curable saturated hydrocarbon polymer compositions offer the characteristics of the organic backbone in combination with an environmentally and worker safe cure system. For example, in the case compositions containing polyisobutylene (PIB) based polymers having alkenyl groups, in solely terminal positions, desirable characteristics of resulting cured products which are typically attained include low gas and moisture permeability and relatively good UV stability, due to the full saturation of the polymer backbone. These features make such compositions potentially useful as insulating glass (IG) sealants which are required to display low moisture and gas permeability and good physical properties. However, such cured sealants need good and durable adhesion to key substrates used in the manufacture of IG units, such as glass aluminium, anodized aluminium, and refined steel and unfortunately said hydrosilylation (addition) curable saturated hydrocarbon polymer compositions are known to display adhesion only to a limited number of substrates and even for those substrates adhesion is quite poor resulting in the need for substrate pre-treatments with for example primers. Therefore, adhesion promoters are added to these formulations. It is advantageous to have hydrosilylation curable compositions containing silyl functional hydrocarbon organic polymers which adhere to substrates without the need for intermediate steps such as the need to apply a separate primer to the substrate surface.

Hydrosilylation curable hydrocarbon polymer compositions are still quite new in insulated glass (IG) applications, and the relevant art on adhesion promoters in these compositions is still quite limited. It appears that no satisfactorily performing adhesion promoter has been identified that enables a sufficiently strong adhesive bond to substrates such as glass, aluminium, anodized aluminium and refined steel. Adhesion to refined steel substrates has been identified as a particular problem as it has proven to be the most difficult substrate to form an adhesive bond with and yet refined steel is becoming an increasingly important substrate for IG manufacture, due to its relatively low thermal conductivity.

Furthermore, insulating glass applications require durable adhesion. This is typically assessed by exposing the sealant/substrate samples either to accelerated weathering (mainly combined ultraviolet light, heat and humidity exposure, referred to in the industry as QUV weathering and typically measured using internationally recognised test methods (ASTM G154) or to hot water immersion.

Saam and Macosko, *Polym. Prepr.*, 26 (2) 48-9 (1985) describe a platinum catalyzed addition reaction between a terminally unsaturated polyisobutylene (PIB) polymer and bifunctional $HMe_2SiOMe_2SiOSiMe_2H$ (where Me is a methyl group) such that a copolymer forms or a tetrafunctional $Si(OSiMe_2H)_4$ which crosslinks the PIB polymer into an elastomer.

Japanese Patent Application Kokai No. 2-75644 describes a curable resin composition comprising (A) a saturated hydrocarbon polymer containing at least one alkenyl group per molecule, (B) a polyorganohydrogen siloxane containing at least two Si—H bonds per molecule, and (C) a platinum catalyst.

U.S. Pat. No. 5,409,995 describes a curable composition comprising (C) an organic curing agent having at least two Si—H groups per molecule, prepared as described therein, (D) an organic polymer having at least one alkenyl group per molecule, and (E) a hydrosilylation catalyst.

Japanese Patent Application Kokai No. 6-279691 describes an addition curable composition having essential components (A) a hydrocarbon type curing agent with a molecular weight of 30,000 or less which contains at least 2 Si—H groups per molecule; (B) a saturated hydrocarbon type polymer with a molecular weight of 100,000 or less which contains at least 1 alkenyl group per molecule, (C) a hydrosilylation catalyst and (D) an adhesion promoter.

WO9621633, describes an addition curable composition having essential components (A) a hydrocarbon having at least 1 alkenyl group in its monomer molecule and a molecular weight of 500 to 300,000; (B) a hardening agent having at least 2 Si—H groups in its molecule; (C) a hydrosilylating agent; and (D) a tackifier.

U.S. Pat. No. 5,880,195 describes an addition curable composition comprising an alkenyl functional organic polymer and an Si—H functional crosslinker having self adhesion to substrates. The addition curable composition comprises an organic polymer having on average at least 1.4 alkenyl groups per molecule, a crosslinker having on average at least 1.4 Si—H groups per molecule, a platinum group metal-containing catalyst, an alkoxy-silicon compound and a titanium compound having Ti—O—C bonds.

U.S. Pat. No. 6,150,441 describes a composition for insulating glass (IG) use which comprises the components (A) a hydrocarbon polymer of 500 to 300,000 in number average molecular weight having at least one alkenyl group(s) in one molecule, (B) a curing agent having at least two Si—H groups in one molecule, (C) a hydrosilylation catalyst, and (D) a tackifier.

The inventors have unexpectedly found that the use of an alkoxy silyl substituted organic oligomer and, optionally a titanium compound having Ti—O—C bonds in an addition curable composition comprising an alkenyl functional organic polymer, Si—H functional crosslinker and catalyst, provides improved adhesion of the cured composition to substrates without the use of a separate primer. Suitable alkoxy silyl substituted organic oligomers are commercially available and do not need to be prepared as separate intermediates.

In accordance with the present invention there is provided a hydrosilylation curable composition comprising the following components:—:
(A) 100 parts by weight of an organic polymer having on average at least 1.4 alkenyl groups per molecule;
(B) an amount sufficient to cure the composition of a crosslinker having on average at least 1.4 Si—H groups per molecule;
(C) a platinum group metal-containing catalyst in an amount sufficient to effect curing of the composition;

(D) 0.1 to 20 parts by weight per 100 parts by weight of (A) of an alkoxy silyl substituted organic oligomer having a number average molecular weight in the range of 200 to 5,000, having a polymer backbone selected from the group of polybutadiene, polyisoprene, polyisobutylene, copolymers of isobutylene and isoprene, copolymers of isoprene and butadiene, copolymers of isoprene and styrene, copolymers of butadiene and styrene, copolymers of isoprene, butadiene and styrene and polyolefin polymers prepared by hydrogenating polyisoprene, polybutadiene or a copolymer of isoprene and styrene, a copolymer of butadiene and styrene or a copolymer of isoprene, butadiene and styrene, and (E) 0 to 2 part by weight per 100 parts by weight of (A) of a titanium compound having Ti—O—C bonds.

In a second embodiment of the present invention there is provided an elastomeric product produced by curing the composition in accordance with the present invention.

Component (A) is an organic polymer having on average at least 1.4 alkenyl groups per molecule. The organic polymer may be linear or branched and may be a homopolymer, copolymer or terpolymer. The organic polymer may also be present as a mixture of different organic polymers so long as there is on average at least 1.4 alkenyl groups per polymer molecule. Specific examples of the polymer backbone include a polyether such as polyoxyethylene, polyoxypropylene, polyoxytetramethylene, polyoxyethylene-polyoxypropylene; a polyester prepared by a condensation of a dibasic acid such as adipic acid and a glycol or by a ring-opening polymerization of lactones; ethylene-propylene copolymer; a polybutylene such as polyisobutylene; a copolymer of isobutylene with isoprene or the like; polychloroprene; polyisoprene; a copolymer of isoprene with butadiene, acrylonitrile, styrene or the like; polybutadiene; a copolymer of butadiene with styrene, acrylonitrile or the like; and a polyolefin prepared by hydrogenating polyisoprene, polybutadiene, a poly-α-olefin or a copolymer of isoprene or butadiene with acrylonitrile, styrene or the like. Preferably component A contains no alkoxy groups.

The preferred organic polymer comprises a homopolymer or a copolymer selected from the group consisting of a polyether, a polyester, a polybutylene where the polybutylene chain may comprise repeat units having the following formulas

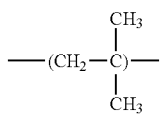

(i.e. an isobutylene unit)

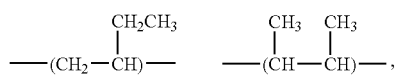

as well as rearranged products such as

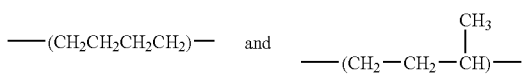

a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

It is more preferred that the organic polymer comprises a homopolymer or copolymer wherein at least 50 mole percent of the repeat units are isobutylene units of the following structure:

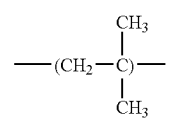

One or more hydrocarbon monomers, such as isomers of butylene, styrene, derivatives of styrene, isoprene and butadiene may be copolymerized with the isobutylene, the preferred co-monomer being selected from 1-butene, α-methylstyrene and isoprene. It is even more preferred that the organic polymer comprise at least 80 mole percent of the isobutylene repeat units described above. Most preferably, the organic polymer, other than the alkenyl groups, is a homopolymer consisting essentially of isobutylene repeat units.

The alkenyl groups in each molecule of component A may be the same or different and may comprises 2 or more carbon atoms, but preferably comprise between 2 and 12 carbon atoms. They may be linear or branched but linear alkenyl groups are preferred. Examples of suitable alkenyl groups include vinyl, allyl, 1-hexenyl and decadecenyl, vinyl and/or allyl are particularly preferred. In preferred embodiments, a group X may bond the alkenyl group to the main chain of the organic polymer, as described by formula:

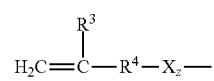

wherein $R^3$ is a hydrogen atom or a methyl radical, $R^4$ is a divalent hydrocarbon radical having between 1 and 18 carbon atoms, and z is 0 or 1. The group X bonds with $R^4$ of the alkenyl group through a group other than carbon, forming an ether, ester, carbonate, amide, urethane or siloxane linkage, preferably an ether linkage, to the main chain of the organic polymer.

The alkenyl groups may be found pendant along the polymer chain or at the chain ends, with it being preferable for the alkenyl groups to be at the chain ends. It is most preferred that the majority of the component A molecules have an alkenyl group at each chain end. While there must be on average at least 1.4 alkenyl groups per organic polymer molecule, it is preferred that each polymer molecule have on average 1.8 to 8 alkenyl groups with 1.8 to 4 alkenyl groups on average per molecule being more preferred.

The alkenyl group may be introduced into the organic polymer by known methods. Typically, the alkenyl groups are introduced during or subsequent to the polymerization process of component A.

Methods for introducing alkenyl groups onto component A after polymerization include, for example, a method comprising reacting an organic polymer having a functional group such as a hydroxyl group or an alkoxide group at the chain end, in the main chain or in the side chain, with an organic compound having an alkenyl group and an active group which is reactive to said functional group so as to introduce the alkenyl group at the chain end, in the main chain or in the side chain. Specific examples of the organic compound having the alkenyl group and the active group which is reactive to said functional group are a $C_3$-$C_{20}$ unsaturated aliphatic acid, acid halide and acid anhydride such as acrylic acid, methacrylic acid, vinyl acetate, acrylic chloride and acrylic bromide; a $C_3$-$C_{20}$ unsaturated aliphatic acid substituted halide such as allyl chloroformate ($CH_2CHCH_2OCOCl$) and allyl bromoformate ($CH_2CHCH_2OCOBr$); allyl chloride, allyl bromide, vinyl(chloromethyl)benzene, allyl(chloromethyl)benzene, allyl(bromomethyl)benzene, allyl chloromethyl ether, allyl (chloromethoxy)benzene, 1-butenyl chloromethyl ether, 1-hexenyl(chloromethoxy)benzene, allyloxy(chloromethyl) benzene and isocyanate functional $C_3$-$C_{20}$ unsaturated aliphatic organic compounds or isocyanate functional silanes having alkenyl groups, such as $Vi(CH_3)_2Si(CH_2)_3NCO$ where Vi is vinyl. Alternatively, allyl-functional polymers may be prepared by conversion of hydroxylated polymers, e.g. polybutadiene by known methods including by reaction with allyl functional isocyanate compounds or reaction with allylchloride in presence of Na. U.S. Pat. No. 4,758,631 describes a method of making telechelic allyl functional polyisobutylene (PIB) polymers by allylation with allyl-trimethylsilane of tertiary, chloro-endcapped PIB by electrophilic substitution. Other methods for making telechelic alkenyl functional polymers are described in U.S. Pat. No. 5,247,021 and EP 1,637,544.

Methods for introducing alkenyl group during polymerization of the polymer of component A includes, for example, a method comprising introducing the alkenyl group in the main chain or at the chain end of the polymer by using a vinyl monomer which has an alkenyl group having a low radical reactivity in the molecule such as allyl methacrylate and allyl acrylate or a radical chain transfer agent which has an alkenyl group having a low radical reactivity such as allyl mercaptan when the organic polymer is prepared by a radical polymerization.

The bonding manner of the alkenyl group to the main chain of the organic polymer is not limited. The alkenyl group may directly bond to the main chain of the organic polymer by a carbon-carbon linkage, or it may bond to the main chain of the organic polymer through an ether, ester, carbonate, amide, urethane or siloxane linkage.

The butylene polymers useful herein may be prepared by methods known in the art, such as described in U.S. Pat. No. 4,758,631 which is hereby incorporated by reference. One telechelic butylene polymer, for example, is available from Kaneka Company (Japan) under the tradename EPION™

The number average molecular weight of the organic polymer may be from 500 to 300,000, preferably, in most instance from 5000 to 20,000 and most preferably from 8000 to 15,000. However, the number average molecular weight of the organic polymer for hot melt compositions (as discussed below), is 15000 to 35000, most preferably from 20000 to 30000. All values of molecular weight herein are provided in g/mol unless indicated otherwise.

Component B, the cross-linker in the composition in accordance with the present invention has on average at least 1.4 Si—H groups per molecule (Component (B)). Although the crosslinker must contain on average at least 1.4 Si—H groups per molecule at least 1.8 Si—H groups are preferred. Furthermore, no more than one silicon-bonded hydrogen atom per silicon atom, there is no other restriction on the crosslinker. For example, the crosslinker may be an organic molecule containing the required Si—H groups as described in U.S. Pat. No. 5,409,995 which is hereby incorporated by reference.

Preferably, component B, the crosslinker, is an organohydrogensilane or organohydrogensiloxane where other than the Si—H bond the Si atom is bonded to for example, oxygen atoms or monovalent hydrocarbon radicals comprising one to seven carbon atoms. Any suitable monovalent hydrocarbon radicals may be utilised, examples include, alkyl groups such as methyl, ethyl, propyl, isopropyl, tertiary butyl, and hexyl; cycloalkyls such as cyclohexyl; aryls such as phenyl and tolyl; and halogen substituted alkyls such as 3,3,3-trifluoropropyl and perfluoropropyl. Preferred is when all of the monovalent hydrocarbon radicals are methyl.

Organohydrogensiloxanes are preferred as Component B, the crosslinker. Examples of suitable organohydrogensiloxanes in the present composition are well known and include those described, for example, in U.S. Pat. No. 3,989,668; U.S. Pat. No. 4,753,978 and U.S. Pat. No. 5,409,995. The organohydrogensiloxanes described in each of the latter publications are incorporated herein by reference. The organohydrogensiloxane crosslinker can be a homopolymer, a copolymer or mixtures thereof, containing for example, diorganosiloxy units, organohydrogensiloxy units, triorganosiloxy units and $SiO_2$ units. The organohydrogensiloxane crosslinker can be linear, cyclic and branched polymers and copolymers or any mixture thereof. It is more preferred to add both a cyclic organohydrogensiloxane and a linear organohydrogensiloxane.

The most preferred crosslinkers are selected from cyclic methylhydrogen siloxane $[MeHSiO]_s$ where s is from 4 to 10 and linear methylhydrogen siloxane $(Me)_3SiO((Me)(H)SiO)_m((Me)_2SiO)_nSi(Me)_3$ where m is from 3 to 10, more preferably 5, and n is from 1 to 5, more preferably 3, in each case where Me is methyl.

The amount of the crosslinker useful in the present composition is that sufficient to cure the composition. Generally, a useful amount of crosslinker is that amount sufficient to provide a molar ratio of Si—H groups to alkenyl groups of the organic polymer within a range of 0.65:10 to 10:1. Preferred is where the molar ratio of Si—H groups of the crosslinker to alkenyl groups of the organic polymer is within a range of about 1:1 to 5:1. More preferred is where the molar ratio of Si—H groups of the crosslinker to alkenyl groups of the organic polymer is within a range of about 1:1 to 3:1.

The crosslinker may be added as a single species or as a mixture of two or more different species. It is preferred to add the crosslinker as a mixture of two or more species.

A platinum group metal-containing catalyst (Component (C)) is used in the curable composition in an amount sufficient to promote curing of the composition. The platinum group metal-containing catalyst can be any such catalyst which is known to catalyze hydrosilylation reactions. By "platinum group metal" it is meant ruthenium, rhodium, palladium, osmium, iridium, and platinum.

Hydrosilylation catalysts are illustrated by the following; chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

Ruthenium catalysts such as $RhCl_3(Bu_2S)_3$ and ruthenium carbonyl compounds such as ruthenium 1,1,1-trifluoroacetylacetonate, ruthenium acetylacetonate and triruthinium dodecacarbonyl or a ruthenium 1,3-ketoenolate may alternatively be used.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4{}_3[(R^{13})_2S]_8$, $(R^{14}{}_3P)_2Rh(CO)X^4$, $(R^{14}{}_3P)_2Rh(CO)H$, $Rh_2X^4{}_2Y^4{}_4$, $H_{a''}Rh_{b''}olefin_{c''}Cl_{d''}$, $Rh(O(CO)R^{13})_{3-n''}(OH)_{n''}$ where $X^4$ is hydrogen, chlorine, bromine or iodine, $Y^4$ is an alkyl group, such as methyl or ethyl, $CO$, $C_8H_{14}$ or $0.5\,C_8H_{12}$, $R^{13}$ is an alkyl radical, cycloalkyl radical or aryl radical and $R^{14}$ is an alkyl radical an aryl radical or an oxygen substituted radical, a'' is 0 or 1, b'' is 1 or 2, c'' is a whole number from 1 to 4 inclusive and d'' is 2, 3 or 4, n'' is 0 or 1. Any suitable iridium catalysts such as $Ir(OOCCH_3)_3$, $Ir(C_5H_7O_2)_3$. $[Ir(Z^3)(En)_2]_2$, or $(Ir(Z^3)(Dien)]_2$, where $Z^3$ is chlorine, bromine, iodine, or alkoxy, En is an olefin and Dien is cyclooctadiene may also be used.

The amount of platinum group metal-containing catalyst useful in effecting curing of the present composition is not narrowly limited as long as there is a sufficient amount present to accelerate a reaction between the Si—H groups and the alkenyl groups. The appropriate amount of the platinum group metal-containing catalyst will depend upon the particular catalyst used. In general as low as about 0.1 parts by weight of platinum group metal based on 1 million parts by weight of organic polymer may be useful (i.e. 0.1 ppm). Preferably the amount of platinum group metal is at least 5 ppm. More preferred is from about 10 ppm to about 200 ppm of platinum group metal.

The platinum group metal-containing catalyst may be added as a single species or as a mixture of two or more different species. Adding the catalyst as a single species is preferred.

The alkoxy silyl substituted organic oligomer, Component (D), is preferably a di- or trialkoxysilyl substituted organic oligomer having a number average molecular weight in the range of 200 to 5,000. Preferably the polymer backbone of component D, is selected from one or more of polybutadiene, polyisoprene, polyisobutylene, copolymers of isobutylene and isoprene, copolymers of isoprene and butadiene, copolymers of isoprene and styrene, copolymers of butadiene and styrene, copolymers of isoprene, butadiene and styrene and polyolefin polymers prepared by hydrogenating polyisoprene, polybutadiene or a copolymer of isoprene and styrene, a copolymer of butadiene and styrene or a copolymer of isoprene, butadiene and styrene. Preferably each alkoxy group per molecule of component D may be the same or different and contains between 1 and 10 carbon atoms, examples include methoxy, ethoxy, propoxy, or butoxy groups. Preferably component D contains no alkenyl groups. Component D cannot be the same as component A.

Preferably Component D is an alkoxysilyl substituted polybutadiene, polyisoprene or polyisobutylene. It is more preferred that the alkoxy silyl substituted oligomer is a trimethoxysilyl substituted 1,4-cis-polybutadiene.

Component D is added in an amount of from 0.1 to 20 parts by weight based on 100 parts by weight of component A. It is preferred for improved adhesion to use from 1 to 20 parts of Component D. It is more preferred to use from 2 to 15 parts of Component D. Component D may comprise a single alkoxy silyl substituted organic oligomer or may be introduced into the composition in accordance with the present invention as a mixture of two or more different species.

The addition curable compositions of this invention optionally include a titanium compound having Ti—O—C bonds (Component (E)). These titanium compounds aid in the shortening of time for development of adhesion between the cured composition and the substrates as well as assisting in the adhesion process. Examples of titanium compounds useful in this invention include Titanates according to the general formula $Ti[OR^5]_4$ where each $R^5$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^5$ include but are not restricted to methyl, ethyl, propyl, isopropyl, butyl, tertiary butyl and a branched secondary alkyl group such as 2,4-dimethyl-3-pentyl. Preferably, when each $R^5$ is the same, $R^5$ is an isopropyl, branched secondary alkyl group or a tertiary alkyl group, in particular, tertiary butyl.

Alternatively, the titanate may be chelated. The chelation may be with any suitable chelating agent such as an alkyl acetylacetonate such as methyl or ethylacetylacetonate. Any suitable chelated titanates or zirconates may be utilised. Preferably the chelate group used is a monoketoester such as acetylacetonate and alkylacetoacetonate giving chelated titanates such as, for example diisopropyl bis(acetylacetonyl) titanate, diisopropyl bis(ethylacetoacetonyl)titanate, diisopropoxytitanium Bis(Ethylacetoacetate) and the like. Examples of suitable catalysts are additionally described in EP1254192 and WO200149774 which catalysts are incorporated herein by reference. Other suitable titanium compounds include $(CH_2CH_2CH_2O)_3TiOTi(OCH_2CH_2CH_3)_3$. Preferred titanium compounds are the tetraalkyltitanates and the chelated titanates. More preferred are tetraisopropyltitanate, tetraisobutyltitanate and titanium diisopropoxy-bis-ethylacetoacetate chelate with tetraisobutyltitanate being most preferred.

The amount of titanium compound needed in this invention will vary depending on the actual titanium compound used and the other ingredients used, for example, the type of crosslinker and can be determined experimentally. Typically, the titanium compound may be added in amounts from 0.05 to 2 part by weight based on 100 parts by weight of organic polymer. It is preferred for improved adhesion to use from 0.1 to 0.6 parts titanium compound. It is more preferred to use from 0.1 to 0.5 parts titanium compound. The titanium compound may be added as a single species or as a mixture of two or more different species.

Whilst a composition in the present invention will readily cure at room temperature it may alternatively be utilised as a hot melt adhesive composition in which component A alone or in combination with an additional thermoplastic component provide the composition with a thermosetting characteristic upon heating. The additional thermoplastic additive functions as a non-reactive binder (at least with the cure system involved in the composition). "Hot melt" materials may be reactive or unreactive. Reactive hot melt materials are chemically curable thermoset products which are inherently high in strength and resistant to flow (i.e. high viscosity) at room temperature. Compositions containing reactive or non-reactive hot melt materials are generally applied to a substrate at elevated temperatures (i.e. temperatures greater than room temperature, typically greater than 50° C.). as the composition comprises at least one organic resin constituent which is significantly less viscous at elevated temperatures (e.g. 50 to 200° C.) than at room temperature or thereabouts. Hot melt materials are applied on to substrates at elevated temperatures as flowable masses and are then allowed to quickly "resolidify" merely by cooling. The thermoplastic component typically has a (midpoint) glass transition points ($T_g$) at temperatures below 0° C. The viscosity of hot melt compositions tend to vary significantly with change in temperature from being highly viscous at relatively low temperatures (i.e. at or below room temperature) to having comparatively low viscosities as temperatures increase towards 200° C. The hot melt resins such as, for example, polyisobutylenes may have viscosities of between 10 and 1000 Pa·s at 150° C. whereas, upon cooling, the highly viscous nature returns with the viscosity being typically greater than 5000 Pa·s at room temperature. It should be appreciated that whilst component D is of a chemically similar basic structure as both component A and the optional additional thermoplastic additive, Component (D) can't function as a thermoplastic constituent in a hot melt adhesive application due to the limitation on molecular weight as hereinbefore described.

The additional thermoplastic additive, when present in the composition may comprise one or more of the following examples polyolefin resins (such as a PIB, a high density polyethylene (HDPE), a low density polyethylene (LDPE), a linear low density polyethylene (LLDPE), an ultrahigh molecular weight polyethylene (UHMWPE), an isotactic polypropylene, a syndiotactic polypropylene, and an ethylene-propylene copolymer resin); polyamide resins (such as nylon 6 (N6), nylon 6,6 (N6,6), nylon 4,6 (N4,6), nylon 11 (N11), nylon 12 (N12), nylon 6,10 (N6,10), nylon 6,12 (N6, 12), a nylon 6/6,6 copolymer (N6/6,6), a nylon 6/6,6/6,10 copolymer (N6/6,6/6,10), a nylon MXD6 (MXD6), nylon 6T, a nylon 6/6T copolymer, a nylon 6,6/PP copolymer, and a nylon 6,6/PPS copolymer); polyester resins (such as aromatic polyesters including polybutylene terephthalate (PBT) and polyethylene terephthalate (PET)); polyether resins (such as polyphenylene oxide (PPO), modified polyphenylene oxide (modified PPO), polysulfone (PSF), and polyether ether ketone (PEEK)); polymethacrylate resins (such as polymethyl methacrylate (PMMA) and polyethyl methacrylate); polyvinyl resins (such as a vinyl alcohol/ethylene copolymer (EVOH), polyvinylidene chloride (PVDC), and a vinylidene chloride/methyl acrylate copolymer); and fluororesins (such as polyvinylidene fluoride (PVDF) and polychlorofluoroethylene (PCTFE)); and polyacrylonitrile resins (PAN). Polyolefin resins, polyester resins, polyether resins, and fluororesins each having a heat distortion temperature of 50° C. or higher are preferable because the composition of the present invention to be obtained has good mouldability and good resistance to heat deformation due to, for example, the outside air temperature when the composition of the present invention is used as a spacer or as an edge-sealant in an insulating glass unit. Alternatively the thermoplastic resin is more preferably a PIB, a low density polyethylene (LDPE) or a linear low density polyethylene (LLDPE) because the resulting composition has a low heat shrinkage, good mouldability, and a low moisture vapour permeability. The thermoplastic resin component may be used alone or as a mixture of two or more resins.

The present composition may cure rapidly at room temperature and typically the cure rate will increase with the increase of temperature. To hinder this curing process an inhibitor may be added to the composition. The inhibitor can be any of those materials known to inhibit the catalytic activity of platinum group metal-containing catalyst. By the term "inhibitor" it is meant a material that retards the room temperature curing of the composition when incorporated in the composition at less than about 10 weight percent of the composition, without preventing the elevated temperature curing of the composition.

Inhibitors for platinum group metal-containing catalysts are well known in the art. Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors are the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule. Other examples of classes of inhibitors which may be useful in the present composition are described in U.S. Pat. No. 5,036,117, which is incorporated herein by reference.

The amount of inhibitor useful in the present composition is not known to be critical and can be any amount that will retard the platinum group metal-containing catalyst catalyzed reaction of the Si—H groups with the alkenyl groups, while not preventing the reaction at elevated temperatures. The specific amount of inhibitor to be used will depend upon the particular inhibitor used, the concentration and type of catalyst, and the nature and amounts of organic polymer and crosslinker. Generally, when an inhibitor is used it is preferred that at least one mole of inhibitor be present for each mole of platinum group metal in the composition and that the inhibitor not exceed one weight percent of the composition.

In addition to the above ingredients, the composition may include additives which impart or enhance certain properties of the cured composition or facilitate processing of the curable composition. Typical additives include, but are not limited to, reinforcing or extending fillers, plasticizers, water scavengers, such as molecular sieves, functional and non-functional diluents, pigments, dyes, and heat and/or ultraviolet light stabilizers. The effect of any such additives should be evaluated as to their result and impact on other properties of the composition. Of these additives plasticisers are regularly utilised in such compositions. Any suitable plasticiser may be utilised. Suitable plasticisers are those which are compatible with the compositions in accordance with the present invention. Preferably such plasticisers are saturated (i.e. no double or triple bonds) and do not poison the hydrosilylation catalyst used in the present composition. Furthermore the plasticisers must be substantially non-fogging when tested according to ASTM E2189-02 and/or EN 1279-6 (July 2002) for an exposure period of 168 hours (7 days). Specific examples include liquid polyolefin plasticisers such as low molecular weight PIBs (Mn=from about 800 to 4000) and suitable process oils such as the commercially available Idemitsu KP100 plasticizer, supplied by Apollo Chemical Corporation, Burlington, N.C., USA. Plasticisers may be present at a level of up to 200 parts by weight per 100 parts by weight of component A.

The addition curable composition of this invention may be prepared by mixing all the ingredients together. When all of the ingredients are mixed together, the composition will begin to cure unless a cure inhibitor is present. If the composition is not to be used immediately after mixing, it should be prepared in at least two parts. Preferably, in a two part kit component B and Component D are retained in a first part and components C and E (when present) are retained in a second part in order to prevent premature cure during storage. At the time of application, the contents of the two parts are mixed together and curing occurs.

The inventors have determined that the addition of an alkoxy silyl substituted organic oligomer and a titanium compound to an alkenyl functional organic polymer, an Si—H functional crosslinker and catalyst enables the composition upon curing to have self adhesion to substrates, especially those involved in the IG manufacture. Furthermore the inventors have identified that compositions in accordance with the present invention are suitable for use as a sealant for insulated glass units which, when in contact to a gas volume between two or more glass panes, does not substantially contribute to chemical fogging.

In accordance with a further aspect of the present invention there is provided a method of forming a sealing elastomeric mass between surfaces which is adherent to at least two such surfaces which method comprises introducing between the surfaces a mass of a curable composition as hereinbefore described in accordance with the invention and enabling said composition to cure. In the case of a hot melt application, the composition is heated prior to application Compositions in accordance with the present invention may be used for a wide range of sealant and adhesive applications. These include applications requiring low permeability (in terms of gases or moisture) seals or adhesives, e.g. sealing, encapsulation or potting materials for electric or electronic components, automotive electronic seals, automotive headlight seals, appliances and the like. The use of compositions in accordance with the present invention in the form of a hot melt adhesive render such compositions suitable for applications requiring low gas permeability (in terms of gas or moisture) combined with fast green strength applications that require quick handling of components, e.g. electronic devices. In accordance with the process and/or composition of the present invention for use as a primary (seal between spacer and glass), secondary (seal between the two glass panes around the spacer) or single sealant (use for both primary and secondary seal) as an edge seal in an insulation glass unit. Use of the composition as a spacer/seal combination in an insulating glass unit either with or without use of a secondary sealant.

EXAMPLES

The following examples are presented for illustrative purposes and should not be construed as limiting the present invention which is delineated in the claims. All measurements given in parts by weight are relative to 100 parts of polymer unless otherwise indicated.

Example 1

Samples A, B and Comparative Sample C 1200 g Panalane® L-14, a low molecular weight polybutene, having viscosity of about 32 mPa·s at 38° C. from Amoco Chemical Comp., were placed in a 5 L Neulinger mixer. In three separate steps, 400 g of Socal® 312, a fatty acid treated, precipitated $CaCO_3$ supplied by Solvay, Brussels, Belgium were added in each step and after each addition the composition was mixed for 5 minutes at 40 rpm engaging only a planetary mixer and for another 5 minutes under vacuum with a planetary mixer at 40 rpm and the dissolver disk at 200 rpm to obtain a smooth paste.

In two separate steps, 300 g of BLR3, a surface treated ground calcium carbonate from Omya, France, were added in each step and after each addition the composition was mixed for 5 minutes at 40 rpm engaging only the planetary mixer and for another 5 minutes under vacuum with the planetary mixer at 40 rpm and the dissolver disk at 200 rpm to obtain a smooth paste.

In three separate steps, 400 g of Epion® 400 A polymer, an allyl endblocked polyisobutylene (PiB), having Mn=10000, supplied by Kaneka Corporation, 3-2-4, Nakanoshima, Kitaku, Osaka 530, Japan, were added in each step and after each addition the composition was mixed for 5 minutes at 40 rpm engaging only the planetary mixer and for another 5 minutes under vacuum with the planetary mixer at 40 rpm and the dissolver disk at 200 rpm. After the last addition the composition was mixed for another 30 minutes under vacuum in a planetary mixer (at 40 rpm and the dissolver disk at 200 rpm) to remove air and provide a homogeneous mixture (smooth paste). The base was filled in cartridges and aged for at least one week prior to use.

Next 100 g of linear trimethylsiloxy terminated methylhydrogen dimethyl siloxanes having a viscosity of 5 mPa·s (cross-linker 1), were mixed for 5 minutes by means of a Semco mixer into the above material together with Polyvest® 25 (a trimethoxysilyl functional, liquid 1,4-cis-polybutadiene, supplied by Huels Aktiengesellschaft, 45764 Marl, Germany, having a mol. weight Mn of 1800-2500 g/mol, a viscosity of 1500-1900 mPas at 20° C. and tetrabutyl titanate in the amounts indicated below for the different Samples.

(A) 2.86 g Polyvest® 25, 0.03 g tetrabutyl titanate, 1.03 g of crosslinker 1 and 0.51 g 1,3,5,7,-tetramethylcyclotetrasiloxane ($D'_4$)

(B) 0.71 g Polyvest® 25 and 0.03 p tetrabutyl titanate, 0.7 g of crosslinker 1 and 0.35 g $D'_4$ (C) 0.7 g crosslinker 1 and 0.35 g $D'_4$ Next, 2 g of a catalyst in the form of a neutralized reaction product of chloroplatinic acid and sym-divinyltetramethyldisiloxane having a platinum concentration of 0.2% by weight were added and mixed with a Semco mixer (5 minutes mixing time).

The formulations utilised are provided in Table 1a below in tabular form in which all measurements given are in parts by weight per 100 parts by weight of Epion® 400A. The platinum IV catalyst amount is given in parts-per-million (ppm)

TABLE 1A

|  | A | B | C (comparative) |
|---|---|---|---|
| Epion ® 400 A | 100 | 100 | 100 |
| Panalene ® L14 | 100 | 100 | 100 |
| Socal ® 312 | 100 | 100 | 100 |
| BLR3 | 50 | 50 | 50 |
| Cross-linker 1 | 3.6 | 2.45 | 2.45 |
| D'4 | 1.8 | 1.23 | 1.23 |
| Polyvest ® 25 | 10 | 2.5 | — |
| Tetrabutyl titanate | 0.1 | 0.1 | 0.1 |
| Pt catalyst (ppm) | 700 | 700 | 700 |
| SiH:alkenyl | 3:1 | 2:1 | 2:1 |

Samples of each composition prepared was then placed on both sides of floated glass, mill finish aluminium and anodized aluminium substrates. The substrates were solvent cleaned (unless indicated otherwise) with an acetone/Isopropanol (50/50) mixture.

Adhesion was tested after 1 week at room temperature (RT) cure, additional water immersion at RT and additional water immersion 50° C.

Samples were tested by tab adhesion in which samples are applied to substrate surfaces and cured/aged as required. A razor blade is then used to detach one end of the cured sealant from the substrate surface and that edge is held between the tester's index finger and thumb and pulled in a perpendicular direction away from the substrate surface. Subsequent to the removal of the sample from the substrate surface the said surface is analysed to determine the type of failure which occurred during the test. These were rated as:

(i) cohesive failure (CF); where when pulled the break is in the adhesive i.e. at least part of the adhesive remains attached to the substrate surface—indicating that the bond strength between the substrate and the sealant is stronger than the adhesive to itself;

(ii) boundary failure (BF); where when pulled the cured sealant is substantially removed from the substrate but does leave a visible residue of sealant attached to the surface of the substrate; and (iii) adhesive failure (AF); where when pulled the cured sealant is removed from the substrate surface without leaving a residue.

Typically cured sealants which provide CF and or BF results are deemed to have an acceptable adhesion to the substrate surface but cured sealants which give AF results are deemed not adequately adhered to the substrate surface. In example 1, Samples A and B both gave excellent results whilst comparative C in which the alkoxy silyl substituted organic oligomer was omitted consistently showed non-adhesion to the substrates tested.

Results for adhesion are given in Table 1b in which the aging criteria were as follows (a) 1 week at standard temperature and relative humidity (23° C. and 50% relative humidity (RH))
(b) As (a)+1 week submerged in water at a temperature of 25° C.
(c) As (a)+1 week submerged in water at a temperature of 50° C.

TABLE 1B

| Substrate | A Aging Criteria | | | B Aging Criteria | | | C (comparative) Aging criteria | | |
|---|---|---|---|---|---|---|---|---|---|
| | (a) | (b) | (c) | (a) | (b) | (c) | (a) | (b) | (c) |
| Glass | CF | CF | CF | CF | CF | CF | AF | AF | AF |
| glass (reverse side) | CF | CF | CF | CF | CF | CF | AF | AF | AF |
| anodized aluminium | CF | CF | CF | CF | CF | CF | AF | AF | AF |
| mill finish aluminium | CF | CF | CF | CF | CF | CF | AF | AF | AF |

Example 2

Samples D, E, F and G

The compositions used for Samples D-G are tabulated in Table 2a below

TABLE 2A

COMPOSITIONS D-G IN PARTS BY WEIGHT PER 100 PARTS BY WEIGHT OF EPION ® 400A

| | D | E | F | G |
|---|---|---|---|---|
| Epion ® 400 A | 100 | 100 | 100 | 100 |
| Panalene ® L14 | 100 | 100 | — | — |
| KP 100 | — | — | 100 | 100 |
| Socal ® 312 | 100 | 100 | 100 | 100 |
| BLR3 | 50 | 50 | 50 | 50 |
| CaO | — | — | 10 | 10 |
| Crosslinker 1 | 3.6 | 3.6 | 3.6 | 3.6 |
| D'4 | 1.8 | 1.8 | 1.8 | 1.8 |
| Polyvest ® 25 | 5 | 10 | 5 | 10- |
| Tetrabutyl titanate | 0.1 | 0.1 | 0.1 | 0.1 |
| Pt catalyst (ppm) | 700 | 700 | 700 | 700 |
| SiH:Alkenyl | 3:1 | 3:1 | 3:1 | 3:1 |

Methods of Preparation

A base for examples D and E was prepared as described in examples A-C. A second base used for example F and G was prepared using the following procedure.

First 900 g of paraffin oil plasticizer (Idemitsu® KP100 plasticizer, supplied by Apollo Chemical Corporation, Burlington, N.C., USA), were placed in a 5 L Neulinger mixer. In three separate steps, 300 g of Socal® 312, a fatty acid treated, precipitated $CaCO_3$ supplied by Solvay, Brussels, Belgium, were added in each step and after each addition the composition was mixed for 5 minutes at 40 rpm engaging only the planetary mixer and for another 5 minutes under vacuum with the planetary mixer at 40 rpm and the dissolver disk at 200 rpm to obtain a smooth paste.

Next 300 g of Epion® 400 A polymer, were added in each step and after each addition the composition was mixed for 5 minutes at 40 rpm engaging only the planetary mixer and for another 5 minutes under vacuum with the planetary mixer at 40 rpm and the dissolver disk at 200 rpm.

Next 225 g of BLR3 and 90 g of calcium oxide were added and mixed for 5 minutes at 40 rpm engaging only the planetary mixer and for another 5 minutes under vacuum with a planetary mixer at 40 rpm and the dissolver disk at 200 rpm to obtain a smooth paste. Next 225 g of BLR3, were added and mixed for 5 minutes at 40 rpm engaging only the planetary mixer and for another 5 minutes under vacuum with the planetary mixer at 40 rpm and the dissolver disk at 200 rpm to obtain a smooth paste.

In two separate steps, 300 g of Epion® 400 A polymer, were added in each step and after each addition the composition was mixed for 5 minutes at 40 rpm engaging only the planetary mixer and for another 5 minutes under vacuum with the planetary mixer at 40 rpm and the dissolver disk at 200 rpm. After the last addition the composition was mixed for another 30 minutes under vacuum in the planetary mixer at 40 rpm and the dissolver disk at 200 rpm to remove air and provide a homogeneous mixture (smooth paste). The base was filled in cartridges and aged for at least one week prior to use.

Next to 100 g of the base 1.54 g of a crosslinker mixture comprising 1.03 g of crosslinker 1 and 0.51 g of D'4 were mixed by means of a Semco mixer into the above material together with various adhesion promoters.

(D) 1.43 g Polyvest® 25 and 0.03 g tetrabutyl titanate (in a Panalene L14 base)
(E) 2.86 g Polyvest® 25 and 0.03 g tetrabutyl titanate (in a Panalene L14 base)
(F) 1.43 g Polyvest® 25 and 0.03 g tetrabutyl titanate (in a KP 100 base)

(G) 2.86 g Polyvest® 25 and 0.03 g tetrabutyl titanate (in a KP 100 base)

Next, 2 g of the platinum catalyst used in Examples A, B and C was added and mixed with a Semco mixer for 5 minutes.

The material was then placed on stainless steel (steel), anodized aluminium (Al anod), mill finish aluminium (Al mill), glass and both cleaned and uncleaned insulated glazing aluminium spacer (Al IG-Spacer) substrates. Prior to application of the material each substrate was solvent cleaned (Acetone/Isopropanol 50/50 mixture) unless indicated otherwise. The material was cured and then left for a period of 4 weeks at room temperature prior to immersion in water for up to 10 weeks at 50° C.

Tab adhesion (as described above) was then tested and results are given in the following tables 2 b-e.

TABLE 2B

TAB ADHESION RESULTS FOR SAMPLE D

|  | Steel | Al anod. | Al mill | glass | Al IG spacer | Al IG spacer un cleaned |
|---|---|---|---|---|---|---|
| 1 week $H_2O$ 50° C. | AF | CF | CF | CF | CF | CF |
| 2 weeks $H_2O$ 50° C. | AF | CF | CF | CF | CF | CF |
| 4 weeks $H_2O$ 50° C. | AF | CF | CF | CF | CF | CF |
| 6 weeks $H_2O$ 50° C. | CF | CF | CF | CF | CF | CF |
| 8 weeks $H_2O$ 50° C. | CF | CF | CF | CF | CF | CF |
| 10 weeks $H_2O$ 50° C. | CF | CF | CF | CF | CF | CF |

TABLE 2C

TAB ADHESION RESULTS FOR SAMPLE E

|  | Steel | Al anod. | Al mill | glass | Al IG spacer | Al IG spacer uncleaned |
|---|---|---|---|---|---|---|
| 1 week $H_2O$ 50° C. | CF | CF | CF | CF | CF | CF |
| 2 weeks $H_2O$ 50° C. | CF | CF | CF | CF | CF | CF |
| 4 weeks $H_2O$ 50° C. | CF | CF | CF | CF | CF | CF |
| 6 weeks $H_2O$ 50° C. | CF | CF | CF | CF | CF | CF |
| 8 weeks $H_2O$ 50° C. | CF | CF | CF | CF | CF | CF |
| 10 weeks $H_2O$ 50° C. | CF | CF | CF | CF | CF | CF |

TABLE 2D

TAB ADHESION RESULTS FOR SAMPLE F

|  | Steel | Al anod. | Al. mill. | glass | Al IG spacer | Al IG spacer uncleaned |
|---|---|---|---|---|---|---|
| 1 week $H_2O$ 50° C. | AF | CA | CA | CF | CF | CF |
| 2 weeks $H_2O$ 50° C. | AF | CF | CF | CF | CF | CF |
| 4 weeks $H_2O$ 50° C. | AF | CF | CF | CF | CF | CF |
| 6 weeks $H_2O$ 50° C. | BF | CF | CF | CF | CF | CF |
| 8 weeks $H_2O$ 50° C. | BF | CF | CF | CF | CF | CF |
| 10 weeks $H_2O$ 50° C. | CF | CF | CF | CF | CF | CF |

TABLE 2E

TAB ADHESION RESULTS FOR SAMPLE G

|  | Steel | Al anod. | Al mill | glass | Al IG spacer | Al IG spacer uncleaned |
|---|---|---|---|---|---|---|
| 1 week $H_2O$ 50° C. | CF | CF | CA | CF | CF | CF |
| 2 weeks $H_2O$ 50° C. | CF | CF | CF | CF | CF | CF |
| 4 weeks $H_2O$ 50° C. | CF | CF | CF | CF | CF | CF |
| 6 weeks $H_2O$ 50° C. | CF | CF | CF | CF | CF | CF |
| 8 weeks $H_2O$ 50° C. | CF | CF | CF | CF | CF | CF |
| 10 weeks $H_2O$ 50° C. | CF | CF | CF | CF | CF | CF |

Example 3

Samples H-K

The following examples were utilised to show the UV durability of compositions in accordance with the present invention. A base was prepared as described in Example F above. To 100 g of the base the following amount of Kronos® 2057 (titanium dioxide pigment from Kronos) was added by means of a Semco mixer (5 min mixing time).

(H) no Kronos® 2057

(I) 1.43 g (5 parts per 100 parts of polymer (Epion® 400 A)), (J) 2.86 g (10 parts per 100 parts of polymer)

(K) 5.71 g (20 parts per 100 parts of polymer)

Next 2.86 g Polyvest® 25, 0.03 tetrabutyl titanate, 1.54 g SiH crosslinker (1.03 g Crosslinker 1 and 0.51 g D'$_4$) and 2 g of the platinum based catalyst used in Examples A, B and C were added. The final compositions of each sample are depicted below in Table 3a

TABLE 3A

COMPOSITIONS OF SAMPLES H-K: (UNLESS OTHERWISE INDICATED ALL MEASUREMENT ARE GIVEN IN PARTS BY WEIGHT PER 100 PARTS BY WEIGHT OF EPION 400A)

|  | H | I | J | K |
|---|---|---|---|---|
| Epion ® 400 A | 100 | 100 | 100 | 100 |
| KP 100 | 100 | 100 | 100 | 100 |
| Socal ® 312 | 100 | 100 | 100 | 100 |
| BLR3 | 50 | 50 | 50 | 50 |
| CaO | 10 | 10 | 10 | 10 |
| Kronos ® 2057 | — | 5 | 10 | 20 |
| Crosslinker 1 | 3.6 | 3.6 | 3.6 | 3.6 |
| D'4 | 1.8 | 1.8 | 1.8 | 1.8 |
| Polyvest ® 25 | 10 | 10 | 10 | 10 |
| Tetrabutyl titanate | 0.1 | 0.1 | 0.1 | 0.1 |
| Pt based catalyst (ppm) | 700 | 700 | 700 | 700 |
| SiH:Alkenyl | 3:1 | 3:1 | 3:1 | 3:1 |

Test Samples for adhesion testing on glass slides were prepared and aged using the following QUV test criteria—fluorescent ultraviolet light/condensation accelerated weathering equipment with cycles of 4 hours of UV light at 60° C. followed by 4 hours in water condensation at 40° C. in accordance with ASTM G154—Standard Practice for Operating Fluorescent Light Apparatus for UV Exposure of Non-metallic Materials (1998).

TABLE 2E-continued

TAB ADHESION RESULTS FOR SAMPLE G

|  | Steel | Al anod. | Al mill | glass | Al IG spacer | Al IG spacer uncleaned |
|---|---|---|---|---|---|---|
| 4 weeks $H_2O$ 50° C. | CF | CF | CF | CF | CF | CF |
| 6 weeks $H_2O$ 50° C. | CF | CF | CF | CF | CF | CF |
| 8 weeks $H_2O$ 50° C. | CF | CF | CF | CF | CF | CF |
| 10 weeks $H_2O$ 50° C. | CF | CF | CF | CF | CF | CF |

The results for the tab adhesion are given in Table 3b

TABLE 3B

TAB ADHESION RESULTS FOR SAMPLES H-K

| | Sample | | | |
|---|---|---|---|---|
| | H (containing 0 parts by weight TiO$_2$) | I (containing 5 parts by weight TiO$_2$) | J (containing 10 parts by weight TiO$_2$) | K (containing 20 parts by weight TiO$_2$) |
| 500 h QUV | CF | CF | CF | CF |
| 1000 h QUV | CF | CF | CF | CF |

Example 4

Samples L and M

The following samples show that the composition in accordance with the present invention can be utilised as a two part composition prior to cure. A two component material was prepared using the following procedures for the two parts.

Part 1

1000 g of the paraffin oil KP 100 were filled into a 2 gallon Ross mixer, 500 g Winofil® SPM11 and 500 g CS11 are added and mixed for 10 min. at 23 rpm. Then 1000 g Epion® 400 A, 0.6 g of carbon black and 200 g titanium dioxide pigment are added and mixed for 10 min at 40 rpm. Then 500 g Winofil® SPM11 (precipitated calcium carbonate from ICI) and 37 g molecular sieve are added and mixed for 20 min. at 60 rpm under vacuum. Next, to 3538 g of this material 56.6 g Pt IV dissolved in KP 100 (0.5% Pt IV solution in KP 100—yielding 80 ppm Pt in the formulation) are added in the same mixer and mixed for 30 min at 60 rpm. The material was scraped down and mixed again for 30 min at 60 rpm.

Part 2

A base was prepared out of 100 parts by weight of Epion® 400A, 100 parts by weight (per 100 parts by weight of the polymer) KP 100, 100 parts by weight Winofil® SPM and 50 parts by weight CS-11 (ground calcium carbonate from Georgia Marble) and 0.014 p of carbon black in a 2 gallon Ross mixer. To 3870 g of this base 229 g of titanium dioxide pigment, 41 g molecular sieve and 0.22 g of carbon black are added and mixed for 30 min at 60 rpm under vacuum. The material was scraped down and mixed for additional 30 min at 60 rpm under vacuum. Next to 370 g of this material 13.42 g of crosslinker 1 and Polyvest® 25 were added in the 1 qt Ross mixer and mixed for 30 min. at 60 rpm. Material was scraped down and mixed for additional 30 min.

(L) 7.4 g Polyvest® 25
(M) 15 g Polyvest® 25

The composition for each of samples L and M are depicted in Table 4a below (all measurements are in parts by weight per 100 parts by weight of polymer (Epion 400A)

TABLE 4A

COMPOSITIONS OF SAMPLES L AND M
(MIXING RATIO PART 1:PART 2 = 1:1)

| | Part 1 (L and M) | Part 2 (L) | Part 2 (M) | L | M |
|---|---|---|---|---|---|
| Epion ® 400 A | 100 | 100 | 100 | 100 | 100 |
| KP 100 | 100 | 100 | 100 | 100 | 100 |
| Winofil ® SPM | 100 | 100 | 100 | 100 | 100 |
| CS11 | 50 | 50 | 50 | 50 | 50 |
| Molecular sieve | 3.7 | 3.7 | 3.7 | 3.7 | 3.7 |
| Titanium dioxide | 20 | 20.7 | 20.7 | 20.4 | 20.4 |
| Carbon black | 0.06 | 0.034 | 0.034 | 0.02 | 0.02 |
| Crosslinker 1 | — | 3.6 | 3.6 | 1.8 | 1.8 |
| Polyvest ® 25 | — | 2 | 4 | 1 | 2 |
| Pt IV in KP 100 | 6 | — | — | 3 | 3 |
| ppm Pt IV in KP 100 | 80 | — | — | 40 | 40 |

Following preparation part 1 and part 2 were filled in plastic cartridges and mixed in a 1:1 ratio using a dispensable static mixer. The material was placed on glass slides and stainless steel and adhesion was tested after various times at room temperature and water immersion. Results for tab adhesion are given in Table 4b below:

TABLE 4B

TAB ADHESION RESULTS AFTER AGING (RT = ROOM TEMPERATURE)

| | L | | M | |
|---|---|---|---|---|
| | Glass | Steel | Glass | Steel |
| 1 day RT | CF | CF | CF | CF |
| 1 day water at 60° C. | — | CF | — | CF |
| 5 days RT | CF | CF | CF | CF |
| 4 day water at 60° C. | — | CF | — | CF |
| 7 days RT | CF | CF | CF | CF |
| 7 days water at 60° C. | — | CF | — | CF |
| 2 weeks RT | CF | CF | CF | CF |
| 2 weeks water at 60° C. | — | CF | — | CF |
| 3 weeks RT | CF | CF | CF | CF |
| 3 weeks water at 60° C. | — | CF | — | CF |
| 4 weeks RT | CF | CF | CF | CF |
| 4 weeks water at 60° C. | — | CF | — | CF |
| 5 weeks RT | CF | CF | CF | CF |
| 5 weeks water at 60° C. | — | CF | — | CF |
| 6 weeks RT | CF | CF | CF | CF |
| 6 weeks water at 60° C. | — | CF | — | CF |
| 7 weeks RT | CF | CF | CF | CF |
| 7 weeks water at 60° C. | — | CF | — | CF |
| 8 weeks RT | CF | CF | CF | CF |
| 8 weeks water at 60° C. | — | CF | — | CF |

The invention claimed is:

1. A hydrosilylation curable composition comprising the following components:
   (A) 100 parts by weight of an organic polymer having on average at least 1.4 alkenyl groups per molecule;
   (B) an amount sufficient to cure the composition of a crosslinker having on average at least 1.4 Si—H groups per molecule;
   (C) a platinum group metal-containing catalyst in an amount sufficient to effect curing of the composition;
   (D) 0.1 to 20 parts by weight per 100 parts by weight of component (A) of an alkoxy silyl substituted organic oligomer having a number average molecular weight in the range of 200 to 5,000, having a polymer backbone selected from the group of polybutadiene, polyisoprene, polyisobutylene, copolymers of isobutylene and isoprene, copolymers of isoprene and butadiene, copolymers of isoprene and styrene, copolymers of butadiene and styrene, copolymers of isoprene, butadiene and styrene and polyolefin polymers prepared by hydrogenating polyisoprene, polybutadiene or a copolymer of isoprene and styrene, a copolymer of butadiene and styrene or a copolymer of isoprene, butadiene and styrene, and (E) 0 to 2 part by weight per 100 parts by weight of component (A) of a titanium compound having Ti—O—C bonds.

2. The hydrosilylation curable composition of claim 1, characterised in that component (A), the organic polymer, has on average 1.8 to 8 alkenyl groups per molecule and has a polymeric backbone selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

3. The hydrosilylation curable composition of claim 2, characterised in that at least 50 mole percent of the repeat units of the organic polymer are isobutylene units.

4. The hydrosilylation curable composition of claim 3, characterised in that the organic polymer has on average 1.8 to 4 alkenyl groups per molecule and at least 80 mole percent of the repeat units are isobutylene units.

5. The hydrosilylation curable composition of claim 4, characterised in that the organic polymer, other than the alkenyl groups, is a homopolymer consisting essentially of isobutylene repeat units.

6. The hydrosilylation curable composition of claim 5, characterised in that the alkenyl groups contain from 2 to 6 carbon atoms and are situated at the organic polymer chain ends.

7. The hydrosilylation curable composition of claim 2, characterised in that the amount of the crosslinker added to the composition provides a ratio of Si—H groups to alkenyl groups of the organic polymer within a range of about 0.65:10 to 10:1.

8. The hydrosilylation curable composition of claim 3, characterised in that the amount of the crosslinker added to the composition provides a ratio of Si—H groups to alkenyl groups of the organic polymer within a range of about 1:1 to 5:1 and the crosslinker is an organohydrogensiloxane.

9. The hydrosilylation curable composition of claim 5, characterised in that the amount of crosslinker added to the composition provides a ratio of Si—H groups to alkenyl groups of the organic polymer within a range of about 1:1 to 2.2:1 and the crosslinker is selected from methylhydrogensiloxane cyclics [(Me)(H)SiO]$_s$ where s is from 4 to 10 and methylhydrogensiloxane linears (Me)$_3$SiO((Me)(H)SiO)$_m$((Me)$_2$SiO)$_n$Si(Me)$_3$ where m is from 3 to 10 and n is from 1 to 5, in each case where Me is methyl.

10. The hydrosilylation curable composition of claim 8, characterised in that the platinum group metal containing catalyst comprises platinum and the amount added to the composition is at least 5 parts by weight of platinum based on 1 million parts of the organic polymer.

11. The hydrosilylation curable composition of claim 9, characterised in that the platinum group metal containing catalyst is a solution of a platinum vinylsiloxane complex and the amount added to the composition is from about 10 parts to 200 parts by weight of platinum based on 1 million parts of the organic polymer and for the crosslinker m is 5 and n is 3.

12. The hydrosilylation curable composition of claim 2, characterised in that there is provided from 0.5 to 3.5 parts by weight of component (D) and 0.1 to 0.6 parts of component (E).

13. The hydrosilylation curable composition of claim 1, further comprising a cure inhibitor.

14. A two part hydrosilylation curable composition in accordance with claim 1, characterised in that a first part contains component (B) and component (D) and a second part contains component (C) and component (E), when component (E) is present.

15. A method of forming a sealing elastomeric mass between substrate surfaces which is adherent to at least two such surfaces which method comprises introducing between the surfaces a curable composition comprising the hydrosilylation curable composition in accordance with claim 1 and allowing the curable composition to cure.

16. The method of claim 15, characterised in that component (A) has on average 1.8 to 8 alkenyl groups per molecule and is selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

17. The method of claim 15, characterised in that component (A), other than the alkenyl groups, is a homopolymer consisting essentially of isobutylene repeat units.

18. The method of claim 15, characterised in that the amount of crosslinker added to the composition provides a ratio of Si—H groups to alkenyl groups of the organic polymer within a range of about 0.65:10 to 10:1.

19. The method of claim 18, characterised in that the amount of crosslinker added to the composition provides a ratio of Si—H groups to alkenyl groups of the organic polymer within a range of about 1:1 to 2.2:1 and the crosslinker is selected from methylhydrogensiloxane cyclics [(Me)(H)SiO]$_s$ where s is from 4 to 10 and methylhydrogensiloxane linears (Me)$_3$SiO((Me)(H)SiO)$_m$((Me)$_2$SiO)$_n$Si(Me)$_3$ where m is from 3 to 10 and n is from 1 to 5, in each case where Me is methyl.

20. The method of claim 19, characterised in that the platinum group metal-containing catalyst comprises platinum and the amount added to the composition is at least 5 parts by weight of platinum based on 1 million parts of the organic polymer.

21. The method of claim 15, further comprising mixing an inhibitor with the hydrosilylation curable composition.

22. The method of claim 18, characterised in that the substrate is glass, aluminium, stainless steel or galvanized steel.

23. A cured composition obtained from the composition claim 1.

24. The cured composition prepared by the method of claim 15.

25. A hot melt adhesive composition comprising the composition in accordance with claim 1 characterised in that component (A) alone or in combination with an additional thermoplastic additive is a thermoplastic component.

26. A hot melt adhesive composition comprising in accordance with claim 25, characterised in that the additional thermoplastic additive is selected from one or more of the following polyolefin resins, a polyisobutylene (PIB), a low density polyethylene (LDPE), a linear low density polyethylene (LLDPE), an ultrahigh molecular weight polyethylene (UHMWPE), an isotactic polypropylene, a syndiotactic polypropylene, and an ethylene-propylene copolymer resin, polyamide resins, polyester resins, polyether resins, polysulfone (PSF), and polyether ether ketone (PEEK); polymethacrylate resins, polyvinyl resins and fluororesins and polyacrylonitrile resins (PAN).

27. A composition in accordance with claim 1 disposed in an insulation glass unit for sealing the insulation glass unit.

28. The hydrosilylation curable composition in accordance with claim 1, further comprising up to 200 parts by weight of a non-fogging plasticiser, per 100 parts by weight of component (A).

29. The hydrosilylation curable composition in accordance with claim 1, wherein component (D) is a trimethoxy substituted 1,4-cis-polybutadiene.

30. A hydrosilylation curable composition comprising the following components:
- (A) 100 parts by weight of an organic polymer having on average at least 1.4 alkenyl groups per molecule;
- (B) an amount sufficient to cure the composition of a crosslinker having on average at least 1.4 Si—H groups per molecule;
- (C) a platinum group metal-containing catalyst in an amount sufficient to effect curing of the composition;
- (D) 0.1 to 20 parts by weight per 100 parts by weight of component (A) of an alkoxy silyl substituted polybutadiene having a number average molecular weight in the range of 200 to 5,000, and
- (E) 0 to 2 part by weight per 100 parts by weight of component (A) of a titanium compound having Ti—O—C bonds.

\* \* \* \* \*